Aug. 8, 1961        S. MEURER        2,995,121

COMPRESSION IGNITION FUEL INJECTION ENGINE

Filed May 23, 1960

INVENTOR

Siegfried Meurer

BY Bailey, Stephens & Huettig

ATTORNEYS

United States Patent Office 2,995,121
Patented Aug. 8, 1961

2,995,121
COMPRESSION IGNITION FUEL INJECTION ENGINE
Siegfried Meurer, Nurnberg, Germany, assignor to Maschinenfabrik Augsburg, A.G., Nurnberg, Germany
Filed May 23, 1960, Ser. No. 30,859
Claims priority, application Germany May 29, 1959
8 Claims. (Cl. 123—32)

This invention relates to internal combustion engines and, in particular, is directed to engines of the self-ignition type.

In engines such as disclosed in the patent to Meurer et al. No. 2,907,308, the combustion chamber has the shape of a body of rotation into which a fuel nozzle is oriented offset from the center of the combustion space and from which the major portion of the fuel is injected in at least two fuel jets to form a film of fuel on the wall of the combustion space. Simultaneously the intake air is given a swirling movement so that the fuel vaporized from the wall of the combustion space is mixed with the air and burned.

In engines of this type, a plurality of fuel nozzles, for example two, are used for each engine cylinder in order to wet the greatest possible area of the wall of the combustion space with a film of fuel. This is particularly necessary in the case of large engine cylinders if the wall surface of the combustion space cannot be wetted with fuel over a sufficient area with one fuel nozzle having a plurality of fuel jets, inasmuch as each fuel jet must be directed in the same direction as the air swirl so that, for practical purposes, all fuel jets have somewhat the same direction. Frequently, it is impossible to install a second fuel nozzle without altering the structure of the cylinder head which is difficult because substantially all of the available space in the cylinder head is ordinarily used by the intake and exhaust ducts and the valves. Again, additional fuel nozzles mean increased costs, including the special piping needed so that the injection pump can supply the plurality of injection nozzles with the appropriate quantity of fuel.

The object of this invention is to employ a single fuel nozzle for each engine cylinder in order to obtain a film deposit over the greatest possible area of the combustion space.

In general, this invention has the advantage of using one fuel nozzle for depositing an increased amount of fuel in the combustion space. Each injection nozzle mounted adjacent the outer edge of the combustion space has at least two fuel jet orifices. However, when two fuel jets are used, one of the jets is directed by special means to a combustion space wall area which is remote from the area wetted by the other jet and which would otherwise remain free of a fuel film.

In accordance with this invention, the fuel is applied directly to the wall of the combustion space by one of the fuel jets in the accustomed manner as disclosed in Patent No. 2,907,308, with the fuel jet being over a very short unrestricted path and in the direction of the air swirl and substantially tangential to the wall of the combustion space. At the same time, the second fuel jet is directed in the form of a compact solid stream of liquid along a portion of the wall of the combustion space not lying within the zone or area upon which the first fuel jet forms a film, the solid stream of liquid being then deposited upon this remote unwetted area in the form of a fuel film under the effect of the air swirl created in the combustion space. For example, the compact solid stream of liquid fuel is moved across and along the meridian line of the combustion chamber space onto the wall area lying opposite the tip of the fuel nozzle. A channel-like recess or groove is formed in the wall of the combustion space within which the fuel flows from the injection nozzle tip to the point where it is spread on the opposite wall surface. This groove protects the compact stream from the air swirl and prevents the fuel from being prematurely spread on the wall of the combustion space. The groove begins immediately adjacent the orifice provided in the injection nozzle for the appropriate fuel jet and extends over a meridian line of the combustion space with its terminal end lying opposite the tip of the fuel nozzle. The flow of the fuel through and out of the groove is facilitated by steadily and progressively decreasing about the last third of the length of the groove toward the terminal end of the groove and ending where the groove is faired into the wall of the combustion space. The groove has a U-shaped or a semi-circular cross-section. It is also expedient to constrict the opening of the groove into the combustion space.

As described, this groove has its terminal or outlet end faired into the wall of the combustion space. It is also possible to convey the fuel to other parts of the combustion space which has the advantage of assisting the cold starting of the engine. Thus, if it is difficult to position a spark plug adjacent the injection nozzle, it is possible to extend the groove through a slot to a position at which the spark plug can be mounted.

The means by which the objects of the invention are obtained are described more fully with reference to the accompanying drawings, in which:

FIGURE 2b is a modification of the form shown in FIGURE 2a;

FIGURE 2c is a further modified form of the form shown in FIGURE 2a;

In the invention as described herein, the combustion space is shown as a combustion chamber in the piston head. However, the combustion space can be in the cylinder head or can be formed partly in the cylinder head and in the piston as shown in Patent No. 2,907,308.

Figure 1:
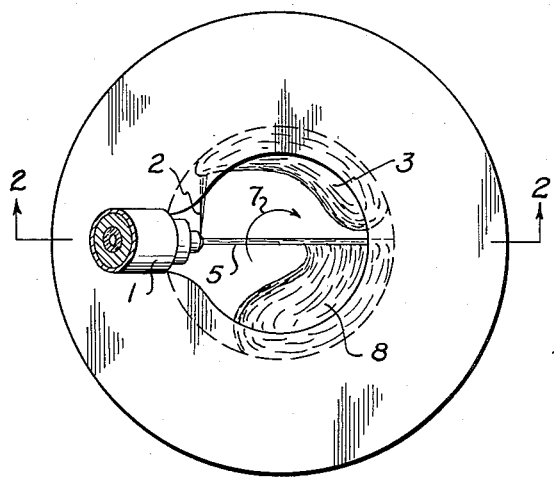
FIGURE 1 is a plan view of a piston and showing a fuel injection nozzle positioned above the combustion space or chamber in the piston.
Figure 2A:
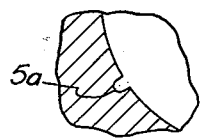
FIGURE 2a is a cross-sectional view taken on the line 2a—2a of FIGURE 2.
Figure 2B:

As shown in FIGURE 1, the injection nozzle 1 has two orifices for injecting two fuel jets into the combustion chamber, which is shown as having a constricted outlet neck. The first fuel jet 2 is directed tangentially of the combustion chamber wall over a short free path to form a film of fuel 3 on the wall of the combustion chamber. The second fuel jet 4 is directed into groove 5 and thus flows to the combustion area 6 on the side of the combustion chamber opposite nozzle 1. The fuel flowing out of groove 5 is deposited under the influence of the air swirl indicated by arrow 7 as a film 8 of fuel on the wall of the chamber. It is clear that the quantity of fuel injected by nozzle 1 is divided into two parts and that therefore the films 3 and 8 are only half as thick as a single film formed with the same amount of fuel. By so doing, a greater area of the wall of the combustion space can be wetted. As shown in particular in FIGURE 2, the second fuel jet 4, after being discharged from the orifice in the tip of injection nozzle 1, flows through groove 5. This groove has a U-shaped cross-section 5a, as shown in FIGURE 2a. However, the groove can have a semicircular cross-section 5b, as shown in FIGURE 2b, or can have a constricted outlet into the combustion space, as shown by the groove 5c of FIGURE 2c. Beginning with the entrance to the groove adjacent nozzle 1, the groove has a uniform depth for about two-thirds of its length toward its outlet end. At about the point 9, the terminal third of the groove is progressively and steadily decreased, so that at about the point 10, its depth is decreased by about one-half, and at about the point 11, the groove ends by being faired into the wall of the combustion chamber. The fuel is thus gradually and sequentially ousted from the groove and is picked up by the air swirl and is spread in the form of film 8 on the wall of the chamber. Groove 5 can be placed in a different position than that shown in order to form a film of fuel on any desired part of the chamber wall.

Figure 2:
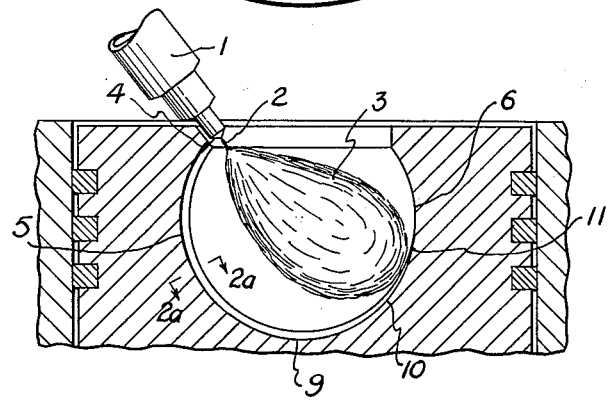
FIGURE 2 is a cross-sectional view taken generally along the line 2—2 of FIGURE 1.
Figure 2C:
Figure 3:
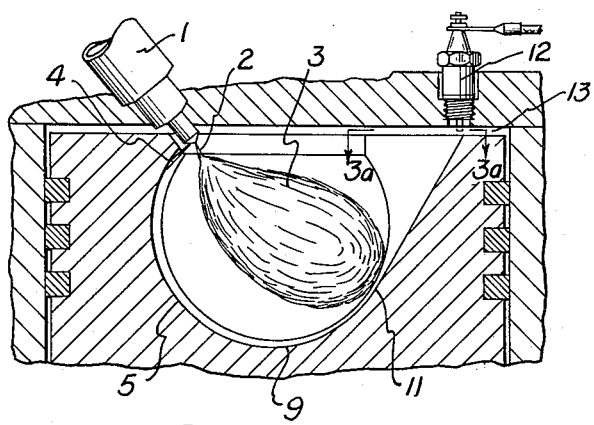
FIGURE 3 is a cross-sectional view of a modification of FIGURE 2.
Figure 3A:
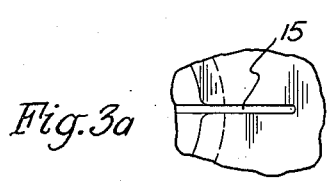
FIGURE 3a is a cross-sectional view taken on the line 3a—3a of FIGURE 3.

In the modification of FIGURE 3, the groove 5 is similar to that shown in FIGURE 2 except that its outlet end is continued into a slot 15 so that only a portion of the fuel will leave the groove to form the fuel film 8. The remaining portion of the fuel flows through slot 15 to the surface of the piston and into the cylinder space. The flow of fuel through slot 15 will take place especially during the starting of an engine when the engine speed is not great enough to give a great intensity to the air swirl formed in the combustion chamber. Thus the fuel flowing through slot 15 flows right up to spark plug 12 by entering cylinder space 13. Thus an ample quantity of fuel is available at spark plug 12 for the purpose of starting the engine.

Having now described the means by which the objects of the invention are obtained, I claim:

1. In an internal combustion engine having cylinder and piston structures constructed and arranged to provide a combustion space in the form of a surface of revolution in which fuel is to be ignited, means for creating a unidirectional air swirl in said space, and an injection nozzle offset from the center of said space and having at least two fuel jets for applying the major portion of the fuel as a film of fuel on the wall of the combustion space, the improvement comprising means for directing one of the fuel jets as a compact solid stream of fuel along the meridian line of the wall of the combustion space to a combustion space wall surface area remote from the fuel film area covered by the other fuel jet, and then distributing the fuel from said compact solid stream as a film of fuel over said remote area.

2. In an engine as in claim 1, said directing means comprising a groove in the wall of said combustion space and extending from immediately adjacent the tip of said injection nozzle on one side of said space across said space and having its terminal end lying in the opposite side of said space.

3. In an engine as in claim 2, said groove in the last third of its length toward its terminal end being progressively decreased in depth until it is faired into the wall of said space.

4. In an engine as in claim 3, said groove having a U-shaped cross-section.

5. In an engine as in claim 3, said groove having a semi-circular cross-section.

6. In an engine as in claim 3, said groove having a constricted open side into said combustion space.

7. In an engine as in claim 3, further comprising a slot extending said groove from its terminal end portion to the exterior of said combustion space.

8. In an engine as in claim 7, further comprising ignition means mounted adjacent said slot.

References Cited in the file of this patent

UNITED STATES PATENTS 2,762,347　　Seegelken _____ Sept. 11, 1956